United States Patent
Häkli et al.

(10) Patent No.: US 8,511,570 B2
(45) Date of Patent: Aug. 20, 2013

(54) TRANSPONDER, TRANSPONDER KIT, METHOD OF APPLYING THE TRANSPONDER AND PRODUCT COMPRISING THE TRANSPONDER

(75) Inventors: Janne Häkli, Vtt (FI); Kaarle Jaakkola, Vtt (FI); Kaj Nummila, Vtt (FI); Juha-Matti Saari, Vtt (FI); Bo Axelsson, Borås (SE); Kari Kolppo, Tampere (FI)

(73) Assignees: Teknologian Tutkimuskeskus VTT, Espoo (FI); SP Technical Research Institute of Sweden, Boras (SE)

( * ) Notice: Subject to any disclaimer, the term of this patent is extended or adjusted under 35 U.S.C. 154(b) by 0 days.

(21) Appl. No.: 13/141,267

(22) PCT Filed: Dec. 17, 2009

(86) PCT No.: PCT/FI2009/051009
§ 371 (c)(1),
(2), (4) Date: Sep. 9, 2011

(87) PCT Pub. No.: WO2010/072891
PCT Pub. Date: Jul. 1, 2010

(65) Prior Publication Data
US 2011/0315777 A1    Dec. 29, 2011

(30) Foreign Application Priority Data
Dec. 22, 2008 (FI) .................................... 20086223

(51) Int. Cl.
*G06K 19/06* (2006.01)
*G06K 7/08* (2006.01)

(52) U.S. Cl.
USPC ............... 235/492; 235/375; 235/451

(58) Field of Classification Search
USPC .......................................... 235/451, 492, 375
See application file for complete search history.

(56) References Cited

U.S. PATENT DOCUMENTS

| 5,785,680 A * | 7/1998 | Niezink et al. .................. 604/57 |
| 6,239,737 B1 * | 5/2001 | Black .............................. 342/51 |

(Continued)

FOREIGN PATENT DOCUMENTS
EP    0 535 919 A2    4/1993

(Continued)

OTHER PUBLICATIONS

Garrett, "Transponders for Timber Management", Forest Management Tech Tips, web page extract from: http://www.fs.fed.us/eng/pubs/html/97241303/97241303.html, as available on Nov. 27, 2008.

(Continued)

*Primary Examiner* — Tuyen K Vo
(74) *Attorney, Agent, or Firm* — Birch, Stewart, Kolasch & Birch, LLP

(57) ABSTRACT

The invention concerns a transponder (10), kit and method for marking wood material, such as logs. The transponder comprises a rigid casing adapted to be inserted into the wood material by means of impact, the casing comprising a wedge-shaped first edge (12) adapted to penetrate into the wood material due to said impact, and a second edge (16) opposite to the first edge, the first and second edges (12, 16) defining an insertion direction of the transponder, and radio-frequency trans-ponding means (20) covered by the casing. According to the invention, the casing is elongated in a direction perpendicular to the insertion direction. The transponder is easily applicable into a log and stays well within the log.

20 Claims, 4 Drawing Sheets

(56) References Cited

U.S. PATENT DOCUMENTS

| | | | |
|---|---|---|---|
| 6,772,546 B2 * | 8/2004 | Latschbacher et al. | 40/299.01 |
| 2002/0170213 A1 * | 11/2002 | Latschbacher et al. | 40/299.01 |
| 2006/0109132 A1 * | 5/2006 | Oishi et al. | 340/572.8 |

FOREIGN PATENT DOCUMENTS

| | | |
|---|---|---|
| EP | 0 578 281 A1 | 1/1994 |
| FR | 2810436 A1 | 12/2001 |
| FR | 2885723 A1 | 11/2006 |
| FR | 2913134 A1 | 8/2008 |
| WO | WO 01/97597 A1 | 12/2001 |
| WO | WO 2009/050337 A1 | 4/2009 |

OTHER PUBLICATIONS

Indisputable Key-Glossary-Transponder Applicator, web page extract from: http://www.indisputablekey.com/glossary/transponder_applicator.php, as available on Aug. 29, 2011.
MoreRFID web page extract from: http//www.morerfid.com/details.php?subdetail=Product&action=d . . . , as available on Nov. 27, 2008.
Gjerdrum, "RFID Tags Applied for Tracing Timber in the Forest Products Chain", http://www.skogoglandskap.no/filearchive/pgj_rfid_and_timber_tracing_denmark09.pdf>Haettu internetistä Jun. 11, 2009.
International Search Report for PCT/FI2009/051009 dated Apr. 6, 2010.

* cited by examiner

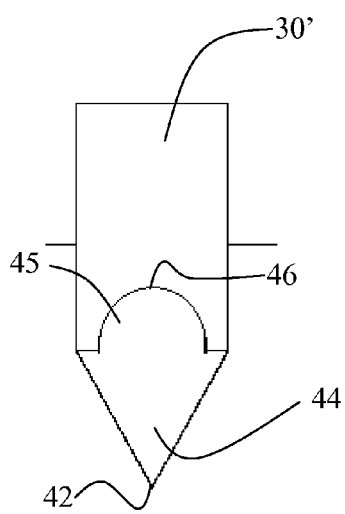
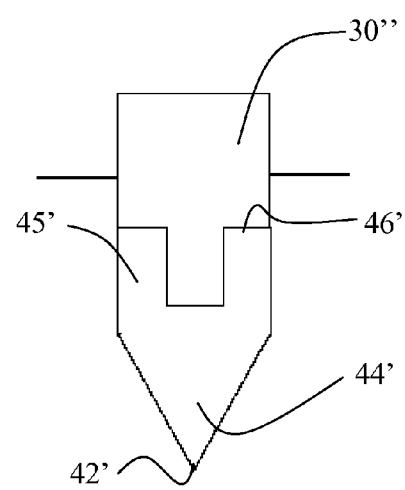
Fig. 4C    Fig. 4D
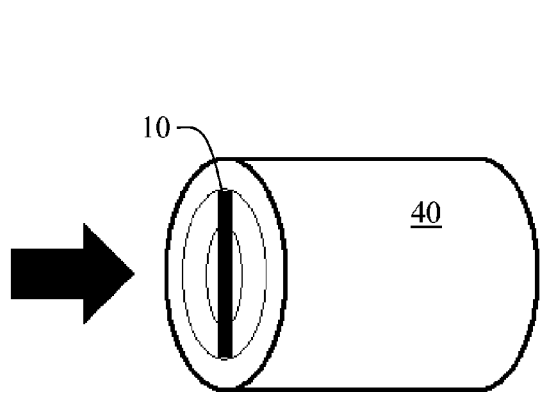
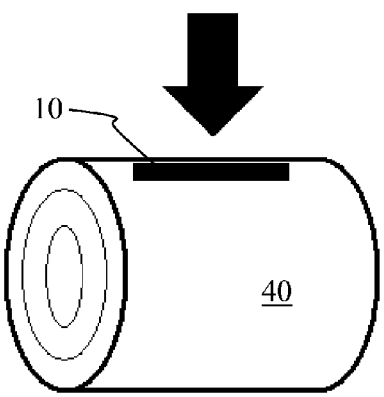
Fig. 5A    Fig. 5B

TRANSPONDER, TRANSPONDER KIT, METHOD OF APPLYING THE TRANSPONDER AND PRODUCT COMPRISING THE TRANSPONDER

FIELD OF THE INVENTION

The invention relates to a special designed radio-frequency transponder and a method of applying the transponder into wood material, in particular into a log. In addition the invention relates to an application kit and a log comprising such transponder. The transponder of the present kind comprises a casing insertable into wood material, and radio-frequency transponding means covered by the casing.

BACKGROUND OF THE INVENTION

Radio-frequency identification (RFID)-based tracing is becoming increasingly common in many fields of trade and industry. Although many industrial sectors have utilized tracing systems, covering the product chain from the supplies of raw materials to the final products in the market, the forestry and wood sector is still in the beginning of this process partly due to a complicated supply chain structure. The nature of logging operation itself, logistics of the forest industry, environmental factors, needs of the user of the logs and the demanding electromagnetic properties of wood set special requirements for the transponder application process and transponders itself, only to mention some aspects. The general objective in this sector is to develop methodology and advanced technologies that can improve the use of wood and optimize the forest production through the chain of transformation, minimizing environmental impacts (www.indisputablekey.com).

Two main types of RFID transponders (tags) are known that can be used for marking logs (http://www.indisputablekey.com/transponder_applicator.php): a patch type transponder, which is inserted into a slot or groove machined into the log, and a nail type transponder, which is inserted into a hole drilled into the wood or hammered directly into the wood. Patch transponders typically have the form of a rectangular slab. However, an additional machining step is undesirable because it slows down and increases the complexity of the marking process and requires expensive special tools. In addition, the transponder may come loose and drop from the log during transportation, for example. On the other hand, a nail-type transponder hammered into the wood has the disadvantage that the antenna of the transponder is buried deep into the wood material and the casing of the transponder has to be manufactured from a very hard and strong material. In practise, it has been found that it is difficult to manufacture a nail-type transponder which is sufficiently strong to be directly nailed into wood. Some examples of nail-type transponders are described in GB 2294846 and the article "Transponders for Timber Management", Skip Garrett, United States Department of Agriculture, Forest Service, Forest Management Tech Tips, March 1997.

SUMMARY OF THE INVENTION

It is an aim of the invention to overcome the above problems and to achieve a novel type of RFID transponder which can be inserted into logs and other wood material. In particular, it is an aim to achieve a transponder and its application method removing the need of pre-processing of the log and to allowing for easy insertion and safe accommodation of the transponder in the log. It is also an aim to achieve a novel transponder insertion kit for the same purpose.

The invention is based on the idea of shaping the transponder such that it is elongated in a direction parallel to the surface of the wood and comprises a wedge-shaped longitudinal edge penetrating foremost to the wood when subjected to an impact. After insertion, the resiliency of the wood holds the transponder firmly within the wood.

The transponder according to the invention comprises
 a rigid casing adapted to be inserted in an insertion direction into wood material by means of impact, the casing comprising a wedge-shaped first edge adapted to penetrate into the wood material due to said impact, and a second edge opposite to the first edge, the first and second edges defining said insertion direction, and
 radio-frequency transponding means covered by the casing.

According to the invention, the casing, in particular the wedge-shaped edge thereof, is elongated in a direction perpendicular to the insertion direction.

By means of the invention, the problems related both to patch-type transponders and nail-type transponders can be avoided. First, no preliminary machining of the wood is required, as the wedge-shaped edge of the transponder is capable of locally displacing wood in the vicinity of the wood surface and thus penetrating into the wood. Second, because the penetration depth of the transponder is significantly lower than that of nail-type transponders, the impact force can be kept at a reasonable level at least in proportion to impact area. In other words better support for the present transponder can be provided during insertion compared with nail-type transponders, preventing breaking of the transponder due to the impact force. Third, the present transponder geometry allows for the (dipole) antenna of the transponder to remain near the surface of the wood, making it easier to interrogate with.

According to one embodiment, the casing comprises one or more shoulders or recesses extending perpendicular to the insertion direction of the transponder from its sides for efficiently preventing disengagement of the transponder from the wood material after insertion. This is because after displacement of the wood material during penetration of the wedge-shaped part of the transponder, the resilient wood material expands as it tries to return to its original shape, thus locking the transponder firmly to the wood.

The kit according to the invention comprises a radio-frequency transponder of the above-described kind and an insertion tool shaped to intimately mate with at least considerable part of the second edge of the transponder casing such that the transponder can be guided with the insertion tool at least partly into the wood material. The transponder is preferably embedded entirely below the surface level of the wood material. After removal of the insertion tool, the resiliency of the wood locks the transponder to the wood. The insertion tool is preferably adapted to nestle against shoulders contained in the transponder for preventing breaking of the shoulders during insertion and for providing a larger contact area between the tool and the transponder. The structure also prevents woods fibres from getting between the tool and the transponder.

The insertion tool and the transponder preferably have a large common contact area in order to prevent cracking of the transponder during its insertion. That is, the insertion tool is preferably in contact with the transponder essentially over the whole length of the transponder. In a typical embodiment, the insertion tool comprises a recess or ridge the second edge of the casing of the transponder is designed to closely fit to. This helps the alignment if the transponder and the insertion tool, evens the pressure subjected to the transponder, and thus makes the marking process more robust.

The method according to the invention comprises
providing a transponder as described above,
placing the second edge of the transponder into an insertion tool intimately mating with the second edge of the transponder,
conveying (for example, hitting) the transponder at least partly into the wood material using the insertion tool,
removing the insertion tool for allowing the resiliency of the wood material immobilize the transponder.

The immobilization preferably comprises expansion of the resilient wood partly back on the route of insertion of the transponder.

The insertion tool can be a hammer-like hitting tool directly struck to the wood with the transponder placed thereon or the insertion tool can be a mandrel-like intermediate tool which is struck by a separate impact member.

According to one embodiment, the transponder is applied at the end of a log or other long-cut wood. This position is beneficial because the transponders are typically read when the logs are in piles or loaded onto a vehicle. It has been found that the transponder as herein described can be well applied either along or across the annual rings. Alternatively, the transponder may be applied on the side of the log. In this position, it is preferred to orient the transponder along the grains of the wood as the mechanical resistance of the wood is lowest and the resiliency of the wood highest in this direction. This is because the transponder does not need to cut wood fibers while penetrating. However, transverse or oblique application is not excluded.

The invention also concerns a log comprising a transponder of the above-described kind buried therein.

The term "longitudinal direction" refers to the direction along the elongated dimension of the transponder, the direction thus being parallel to the surface to which the transponder is inserted. The term "insertion direction" refers to a direction perpendicular to the longitudinal direction and parallel to the impact force which is used when the transponder is applied to the wood. The "lateral direction" is perpendicular to the insertion direction and the longitudinal direction.

The term "elongated" is to be construed broadly, primarily meaning that the dimension of the transponder, in particular the wedge-shaped first edge thereof, in at least one direction perpendicular to the insertion direction is at least twice, typically at least four times the dimension of the transponder in the insertion direction. Thus, the invention significantly differs from nail-type transponders by this "horizontal" orientation with respect to the surface it is being applied on.

Further embodiments and advantages of the invention are described hereinafter with reference to the attached drawings.

BRIEF DESCRIPTION OF DRAWINGS

FIGS. 4C and 4D show in cross-sectional views further embodiments of the transponder and the application tool, FIGS. 5A and 5A illustrate positioning of the transponder into a log according to two embodiments of the invention, respectively.

DETAILED DESCRIPTION OF EMBODIMENTS

Figure 1:
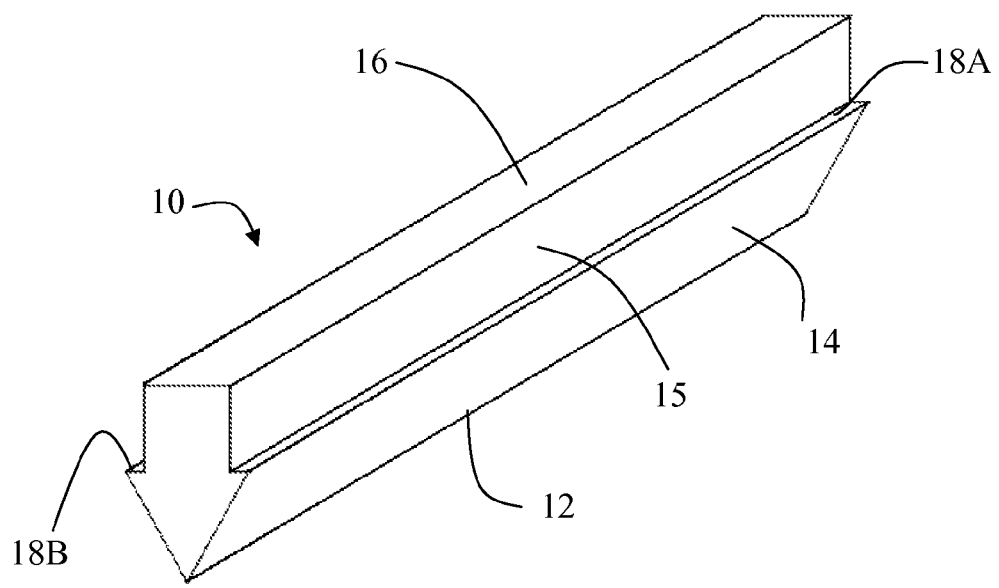
FIG. 1 illustrates in a perspective view a transponder according to one embodiment of the invention.

FIG. 1 shows a transponder 10 according to one embodiment of the invention. The transponder 10 is elongated in one direction and comprises a wedge-shaped first edge 12 on a longitudinal side thereof, the first edge 12 being adapted to penetrate to wood foremost. An elongated wedge-shaped first portion 14 extends from the first edge 12, serving to displace wood while the first edge 12 penetrates into the wood. The transponder further comprises a second portion 15, which extends from the broadest point of the wedge-shaped first portion 14 away from the first edge 12 and forms the second edge 16 of the transponder.

Figure 2:
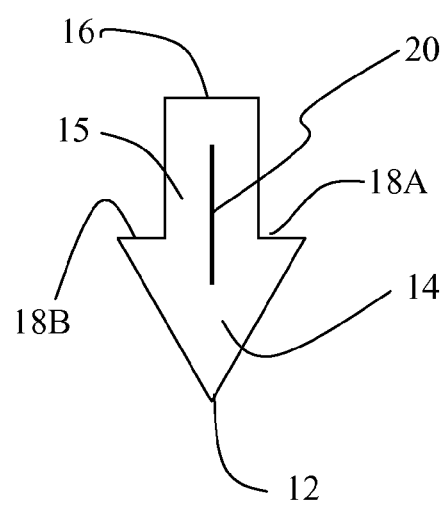
FIG. 2 shows a cross-sectional view of the transponder illustrated in FIG. 1.

According to the embodiment shown in FIG. 1, the wedge-shaped first portion 14 has a maximum width in the lateral direction, which is greater than the maximum width of the second portion 15. In other words, there are formed two shoulders 18A, 18B extending in the lateral direction of the transponder at the region between the wedge-shaped first portion 14 and the second portion 15. The purpose of the shoulder is to hold the transponder firmly in the wood after application of the transponder. The shoulders 18A, 18B are preferably also wedge-shaped to provide easy insertion and increased mechanical backward resistance. As is shown in FIG. 2, the cross-section of the transponder of FIG. 1 is arrow-like, the first portion 14 being essentially triangular and the second portion 15 being essentially rectangular. This results in a wood-penetrating but still well-staying geometry of the transponder casing.

According to a preferred embodiment, the opening angle of the wedge-shaped portion 14 is 40-75 degrees, in particular 50-65 degrees. At least for certain sorts of wood, an opening angle of about 58 degrees has been found to be well suitable.

The dimension of the transponder in the longitudinal direction is at least 2, preferably at least 4 times the dimension of the transponder in the insertion direction, thus giving the transponder an elongated shape. The longitudinal dimension of the tag may be, for example, 30-150 mm, in particular 50-100 mm. The lateral width of the transponder (from shoulder 18A to shoulder 18B) is typically 3-10 mm, in particular 4-6 mm and the height of the transponder 4-20, in particular 6-12 mm. The width of the shoulder is preferably at least 0.5 mm for, providing strong fixation of the transponder to wood.

There are several variations to the above-described casing geometry. In particular, the shoulders may be supplemented or replaced with other forms of local holding means interacting with the wood. For example, there may be provided more shoulders on lateral sides and/or longitudinal ends of the casing. In addition or alternatively, there may be provided one or more recesses, such as grooves, on sides or ends of the casing, to which the resilient wood can enter and thus hold the transponder within the wood. In addition or alternatively, the casing may be manufactured from high-friction material and/or have a roughened zone which locally increases friction between the wood and the transponder.

Figure 3:
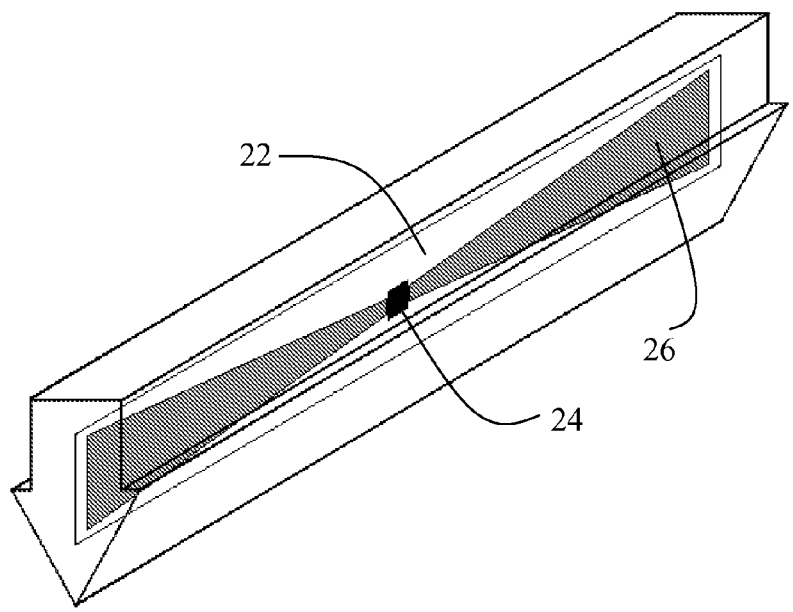
FIG. 3 illustrates in a perspective view the transponder of FIG. 1 and an RFID antenna and chip buried therein.

As shown in FIGS. 2 and 3, the radio-frequency transponding circuitry 20, i.e., an RFID microchip 24 and an antenna 26, are contained within the casing of the transponder 10, thus being well protected. According to a preferred embodiment, the antenna 26 extends primarily in the longitudinal direction of the transponder (the longitudinal dimension of the transponder defining the maximum length of the antenna 26). As shown in FIG. 3, the antenna may also have a significant dimension in the insertion direction of the transponder. According to the embodiment shown, the antenna 26 is a dipole consisting of two triangular branches extending into opposite directions from the microchip 24. However, a rectangular dipole antenna is expected to perform at least as well. As appreciated by a person skilled in the art, the shaping of the antenna 26 and positioning of the antenna 26 and the microchip 24 within the transponder may vary a lot.

The antenna 26 is typically formed of metal or metal-containing material.

The microchip 24 and the antenna 26 are preferably integrally formed and completely contained within the transponder casing. This means that that it is impossible to remove the microchip 24 and antenna 26 without breaking the transponder. Typically, the microchip 24 and the antenna 26 are buried within the casing material during injection or compression moulding or extrusion of the casing or by attaching separately molded casing halves together.

According to one embodiment, the microchip 24 and the antenna 26 are contained on a substrate 22 so as to form an inlay which is inserted into the casing during the manufacture of the casing. According to one embodiment, the inlay is placed on a first casing half which is attached to a second casing half with or without an adhesive in order to make a complete casing. According to an alternative embodiment, the inlay is buried into the casing material during molding of the casing.

According to an alternative embodiment, the antenna 26 is printed using conductive printing ink or the like on a first casing half. The microchip 24 may be attached to the first casing half either before or after the printing of the antenna and is electrically connected to the antenna 26. After application of the antenna 26, the casing is finalised by molding or by attaching the first casing half to another casing half. According to a modification of this technique, the antenna is transferred on the first casing half using a film transfer technology, such as, the Aspact technology by Aspact Oy, Finland.

The casing is preferably manufactured from moldable material suitable for injection or compression moulding or extrusion. The material is preferably biodegradable. The material may be polymeric. According to a preferred embodiment, the casing is manufactured from pulping-compatible material, such as artificial wood or "liquid wood". Such materials typically contain natural polymer, such as lignin and natural fibres. Arboform® by Tecnaro GmbH is mentioned as an example of such materials. This allows for the marked wood to be brought into pulping process without the need of removing the transponder, provided that the transponding means, i.e., the microchip and antenna, are also made of pulping-compatible materials or have only minor amounts of undesired components. This is typically the case when thin-layer technology for example as described herein is used for producing the antenna.

Pulping compatible materials can be added in minor amounts with other raw materials into mechanical, chemimechanical or chemical pulping processes. A pulping compatible material fragments or dissolves during the pulping process, leaving behind no components detrimental to the process. In particular, such materials do not have a negative effect on the quality of paper manufactured from logs marked with transponders made of such materials. Such materials typically consist essentially of natural components and, optionally, other additives inherently present in pulp and/or recovered in standard pulping processes.

With reference to FIG. 5, the resent special designed wedge-shaped transponder 10 can be applied on the end or on the side of a log 40. These two locations of application and the respective preferred transponder orientations are illustrated in FIGS. 5A and 5B, respectively. The transponder shape illustrated in FIGS. 1-3 is suitable for both locations. The transponder penetrates the log best when inserted in direction of the grains of the wood. After being applied, the shoulders of the wedge together with the elasticity of the wood ensure that the transponder stays well inside the log and, according to our experiments, is very difficult to remove. When inserted into the log, the transponder is also protected from any external strain that could break or remove the transponder during e.g. log handling.

The wedge-shaped transponder is inserted into the log preferably using a special tool. The application tool comprises a preferably metallic recess, such as a groove-shaped bowl for the transponder. The shape of the bowl corresponds to the shape of the non-wedged second portion of the transponder. The tool may also comprise a shaft and/or handle or other type of mechanical means for hitting the bowl with the transponder into the log. The harshest mechanical stress of the application process is received by the single-use transponder instead of the application tool.

Figures 4A, 4B:
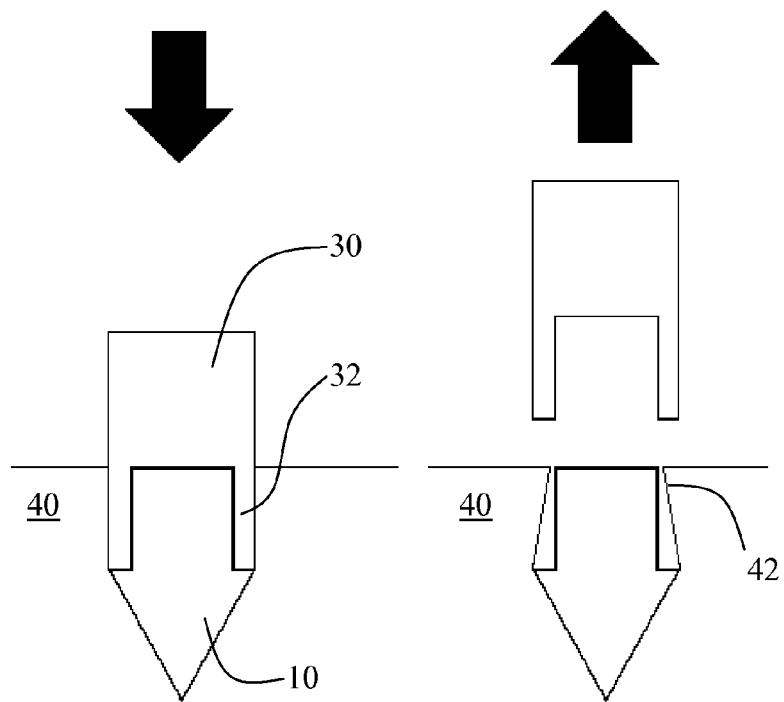
FIGS. 4A and 4B show in cross-sectional views two main stages of the application process of the transponder according to one embodiment of the invention.

The principle of the application is shown in FIGS. 4A and 4B. In the first stage, the transponder 10 is hit into the wood 40 with the application tool 30 and in the second stage the application tool 30 is removed in order to let the resiliency of the wood 40 to lock the transponder 10 into the wood 40. As is shown in the figure, the application tool 30 comprises a recess defined by narrow regions 32 of material surrounding the recess. These regions preferably have the thickness smaller than or equal to the width of the shoulders of the transponder (if present). The recess is shaped such that the non-wedged second portion of the transponder intimately mates with the application tool 30. The recess may also be designed to have a tight fit such that the transponder 10 stays well in the application tool 30 before application.

FIGS. 4C and 4D illustrate alternative shapes of the transponder and corresponding application tools. According to the embodiment illustrated in FIG. 4C, the transponder comprises a wedge-shaped portion 44 and wood-penetrating edge 42 similarly to the embodiment described above with reference to FIGS. 1-3. The surface 46 of the second portion 45 of the transponder coming in to contact with the application tool 30', is however, rounded, in particular semi-circular. This form has found to be advantageous as regards the mechanical stress undergone by the transponder during application. The transponder is also provided with retaining shoulders. It must be understood that the second portion can also have any other shape which providing suitable lateral support with respect to the application tool so that the transponder is easy to insert. One advantage of a protruding central second portion, for example, of the above-described kinds is that there will be more space for the antenna of the transponder.

In the embodiment shown in FIG. 4D, the transponder still comprises a wedge-shaped portion 44' and wood-penetrating edge 42'. In this embodiment, the second portion 45' is shaped so as to have a central groove along the elongated direction into which a special designed application tool 30" can be fitted such that it conforms to the upper surface 46' of the transponder. The transponder shown in FIG. 4D is non-shouldered but it can be applied below the wood surface level, as shown in the figure, so that the expansion of the wood locks the transponder in place. Thus, the upper elongate corners of the transponder form the locking shoulders. Even if not applied that deep, the transponder has found to remain relatively well in the wood by means of the resiliency of the wood and friction between the wood and the transponder.

It must be understood that also other shapes for the transponder are possible than those described in detail. For example, instead of being triangular, i.e., linearly broadening, the wedge-shaped portion may be non-linearly broadening from the wood-penetrating edge towards the second end of the transponder. Furthermore, instead of elongation only in one direction perpendicular to the insertion direction, there may one or more branches or portions which extend in another such direction. Thus, instead of the most preferred I-shape, the transponder can be for example, X-, Z-, L-, T-, V- or even O-shaped. The application tool is shaped accordingly.

Figure 6:
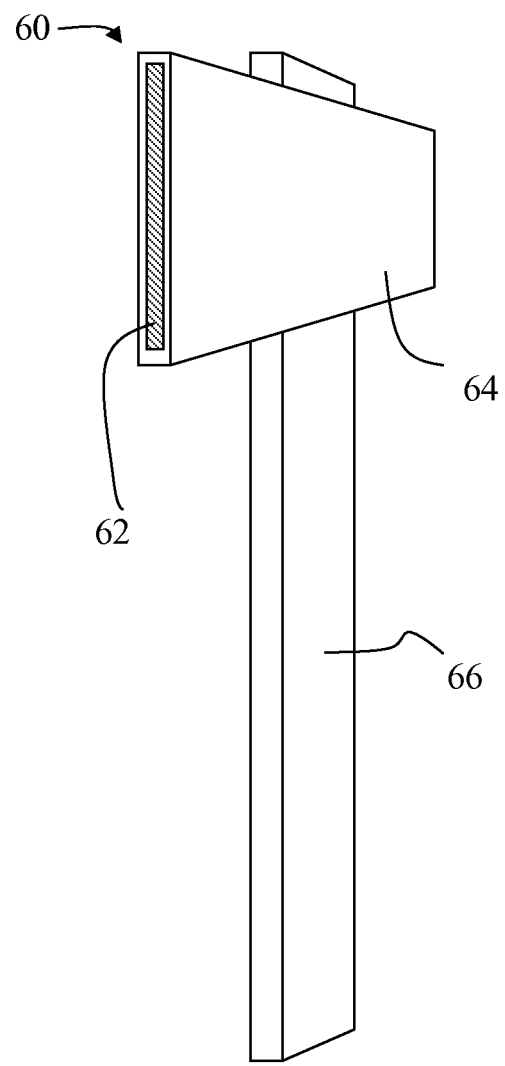
FIG. 6 shows a manual transponder application tool according to one embodiment.

A manual application tool, i.e. applicator, according to one embodiment of the invention is shown in FIG. 6. The applicator resembles an axe, comprising a head 64 and a shaft 66 attached to the head 64. Instead of a sharp blade, the head 64 comprises a recess 62 on the having thin surrounding walls. Alternatively the applicator may be an automated device comprising a recessed applicator head and means for subjecting a sufficient force to the applicator head for burying the transponder into the wood. The device may also comprise means for automatically feeding the transponder to the applicator head before burying.

The invention claimed is:

1. A radio-frequency transponder for marking wood material, comprising
    a rigid casing adapted to be inserted into the wood material by means of impact, the casing comprising a wedge-shaped first edge adapted to penetrate into the wood material due to said impact, and a second edge opposite to the first edge, the first and second edges defining an insertion direction of the transponder, and
    radio-frequency transponding circuitry covered by the casing,
wherein the casing is elongated in a direction perpendicular to the insertion direction.

2. The transponder according to claim 1, wherein the casing comprises one or more shoulders or recesses extending perpendicular to the insertion direction.

3. The transponder according to claim 1, wherein the casing comprises
    a wedge-shaped first portion extending from the first edge towards the second edge and having a first maximum width perpendicular to the insertion direction and perpendicular to the elongated direction, and
    a second portion having a second maximum width which is smaller than the first maximum width.

4. The transponder according to claim 3, wherein the second portion is rectangular or arc-like.

5. The transponder according to claim 4, wherein the second portion is semi-elliptical or semi-circular in cross-section in a plane perpendicular to the elongated direction.

6. The transponder according to claim 1, wherein the transponder is arrow-shaped in cross-section in a plane perpendicular to the elongated direction.

7. The transponder according to claim 1, wherein the dimension of the transponder in the elongated direction is at least 2 times the dimension of the transponder in the insertion direction.

8. The transponder according to claim 7, wherein the dimension of the transponder in the elongated direction is at least 4 times the dimension of the transponder in the insertion direction.

9. The transponder according to claim 1, wherein the first edge of the casing defines an angle of 40-75 degrees.

10. The transponder according to claim 9, wherein the first edge of the casing defines an angle of 50-65 degrees.

11. The transponder according to claim 1, wherein the radio-frequency transponding circuitry comprises
    a microchip, and
    an antenna electrically connected to the microchip extending inside the casing in said elongated direction.

12. The transponder according to claim 11, wherein the microchip is an RFID microchip.

13. The transponder according to claim 1, wherein the radio-frequency transponding circuitry is integrally formed into the casing, for example, during injection or compression moulding or extrusion of the casing.

14. The transponder according to claim 1, wherein the radio-frequency transponding circuitry lies on a substrate, which is placed into the casing.

15. A kit for marking wood material, comprising
    the radio-frequency transponder according to claim 1, and
    an insertion tool shaped to intimately mate with the second edge of the transponder casing such that the transponder can be guided with the insertion tool into the wood material.

16. The kit according to claim 15, wherein the insertion tool comprises a recess or projection which the second edge of the casing can be inserted to.

17. A method of marking wood material, said method comprising
    providing the transponder according to claim 1,
    placing the second edge of the transponder into an insertion tool intimately mating with the second edge of the transponder,
    conveying the transponder at least partly into the wood material using the insertion tool,
    removing the insertion tool for allowing the resiliency of the wood material to immobilize the transponder.

18. The method according to claim 17, wherein the transponder is inserted along the direction of grains of the wood material or to an end of long-cut timber.

19. A log comprising a transponder according to any of claim 1 buried therein.

20. The transponder according to claim 1, wherein said wood material includes logs.

* * * * *